US007133854B2

(12) United States Patent  
Imbert De Tremiolles et al.

(10) Patent No.: US 7,133,854 B2  
(45) Date of Patent: Nov. 7, 2006

(54) METHOD AND CIRCUITS FOR ENCODING AN INPUT PATTERN USING A NORMALIZER AND A CLASSIFIER

(75) Inventors: Ghislain Imbert De Tremiolles, Saint Paul (FR); Pascal Tannhof, Fontainebleau (FR)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 10/014,166

(22) Filed: Dec. 11, 2001

(65) Prior Publication Data

US 2002/0095394 A1    Jul. 18, 2002

(30) Foreign Application Priority Data

Dec. 13, 2000  (FR)  ................................. 00 480117

(51) Int. Cl.  
   *G10L 19/12*   (2006.01)  
   *G06E 1/00*    (2006.01)  
   *G06E 3/00*    (2006.01)  
   *G06F 15/18*   (2006.01)  
   *G06G 7/00*    (2006.01)  
   *G06F 15/16*   (2006.01)

(52) U.S. Cl. ............................. 706/20; 706/26; 706/12; 704/223; 709/247

(58) Field of Classification Search ................ 706/15, 706/20, 26, 12; 704/224, 223; 709/247  
See application file for complete search history.

(56) References Cited

U.S. PATENT DOCUMENTS

| 5,422,981 | A  | * | 6/1995 | Niki ........................... 706/20 |
| 5,621,863 | A  |   | 4/1997 | Boulet et al. ............... 395/124 |
| 5,729,691 | A  | * | 3/1998 | Agarwal ..................... 709/247 |
| 5,794,185 | A  | * | 8/1998 | Bergstrom et al. .......... 704/223 |
| 6,105,015 | A  | * | 8/2000 | Nguyen et al. ............... 706/26 |
| 6,377,941 | B1 | * | 4/2002 | Steimle et al. ................ 706/26 |
| 6,732,083 | B1 | * | 5/2004 | Bax ............................. 706/12 |

* cited by examiner

*Primary Examiner*—Anthony Knight  
*Assistant Examiner*—Sunray Chang  
(74) *Attorney, Agent, or Firm*—Daniel P. Morris, Esq.; Perman & Green, LLP

(57) ABSTRACT

Let us consider a plurality of input patterns having an essential characteristic in common but which differ on at least one parameter (this parameter modifies the input pattern in some extent but not this essential characteristic for a specific application). During the learning phase, each input pattern is normalized in a normalizer, before it is presented to a classifier. If not recognized, it is learned, i.e. the normalized pattern is stored in the classifier as a prototype with its category associated thereto. From a predetermined reference value of that parameter, the normalizer computes an element related to said parameter which allows to set the normalized pattern from the input pattern and vice versa to retrieve the input pattern from the normalized pattern. As a result, all these input patterns are represented by the same normalized pattern. The above method and circuits allow to reduce the number of required prototypes in the classifier, improving thereby its response quality.

23 Claims, 7 Drawing Sheets

(learning)
FIG. 7

METHOD AND CIRCUITS FOR ENCODING AN INPUT PATTERN USING A NORMALIZER AND A CLASSIFIER

FIELD OF THE INVENTION

The present invention relates to data processing and more particularly to a method and circuits for encoding an input pattern using a normalizer and a classifier in the learning phase which significantly reduce the number of required prototypes. The present invention also relates to the method and circuits to recognize a new (unknown) input pattern during the classification phase.

BACKGROUND OF THE INVENTION

Using classifiers in the technical literature, the learning and classification (or recognition) tasks require the essential step of processing input patterns. During the learning phase, this step is performed to define whether or not the input pattern needs to be learned in the classifier. During the classification phase, for instance, in the K Nearest Neighbor (KNN) mode, when a new input pattern is presented to the classifier, this step is used to find the closest pattern(s) stored in the ANN as prototype(s). Finding the closest stored prototype(s) mainly consists to compute the distances between the input pattern and the stored prototypes and then, to determine the minimum distance(s) among the computed distances. In the following description, the preferred classifier is the input space mapping algorithm based artificial neural network (ANN) described in U.S. Pat. No. 5,621,863 assigned to IBM Corp that includes innovative elementary processors of a new type, referred to as the ZISC neurons, (ZISC is a registered trade mark of IBM Corp). An essential characteristic of the ZISC neurons (now commercially available in silicon chips) lies in their ability to work in parallel, i.e. when an input pattern is presented to the ANN, all ZISC neurons compute the distance between the input pattern and all the prototypes stored in the neurons of the ANN at the same time. One important aspect of these algorithms is the distance evaluation relation, referred to as the "norm", that is used in the distance evaluation process. The choice of this norm is determined by the problem to be solved on the one hand, and on the other hand by the knowledge used to solve this problem. In a ZISC neuron, the final distance (Dist) between an input pattern A and the prototype B stored therein (each having p components) is calculated using either the MANHATTAN distance (L1 norm), i.e. $Dist_{L1}=\Sigma|A_i-B_i|$ or the MAXIMUM distance (Lsup norm), i.e. $Dist_{Lsup}=max|A_i-B_i|$ wherein $A_i$ and $B_i$ are the components of rank i (variable i varies from 1 to p) for the input pattern A and the stored prototype B respectively. Other norms exist, for instance the L2 norm such as $Dist_{L2}$ $\sqrt{\Sigma(Ai-Bi)^2}$. The L2 norm is said to be "Euclidean" while the L1 and Lsup norms are examples of "non-Euclidean" norms, however, they all imply the computation of a difference $(A_i-Bi)$ for each component in the distance evaluation. In the ZISC neuron, the choice between the L1 or Lsup norm is determined by the value of a single bit referred to as the "norm" bit No stored in the neuron. Other Euclidean or non-Euclidean norms are known for those skilled in the art.

In many applications based on these input space mapping based algorithms, for instance in signal and image processing, the mail step consists in analyzing an essential characteristic of the input patterns. Although a determined input pattern and the prototypes stored in the ANN can be similar (or even identical) as far as this essential characteristic is concerned, the distance therebetween may be high due to the other parameters taken into consideration in the distance evaluation process. As a consequence, it is often necessary to use as may neurons as there are different variations in the input patters to store them as different prototypes. The two examples described below will illustrate this major inconvenience.

Let us first consider two input patterns which are electrical signals S1 and S2, each representing a voltage amplitude varying as a function of time i.e. V=f(t) in a range between a minimum value (Vmin) and a maximum value (Vmax). As apparent in FIG. 1, in the interval $[t_0,t_1]$ defined by times $t_0$ and $t_1$, the curves depicting signals S1 and S2 have the same aspect. This common characteristic will be referred to hereinbelow as a "shape". They exhibit the same variation, because they have the same gradient in absolute value and sign, but they are centered around two different mean values. The mean value is thus the parameter which distinguishes the two signals S1 and S2 in the time interval in consideration. In the instant case, let us assume the voltage range (from Vmin to Vmax) is coded on 8 bits with 16 points of sampling. In this time interval, assuming Vmin=0 and Vmax=255, signals S1 and S2 are respectively represented by the values given in tables T1 and T2 after sampling and coding. In the FIG. 1 case, because the amplitude values of signals S1 and S2 are different, two neurons having at least 16 components are required to store signals S1 and S2 as two different prototypes in the learning phase even if their variations look similar on the totality of the time interval. On the other hand, in the classification phase, when an input pattern is presented to the ANN for classification, e.g. signal S3 (corresponding values are given in table T3) placed between signals S1 and S2 and having the same variation in said time interval but a different mean value, it could be not recognized as close (i.e. similar) to either signal S1 or S2.

Figure 2:
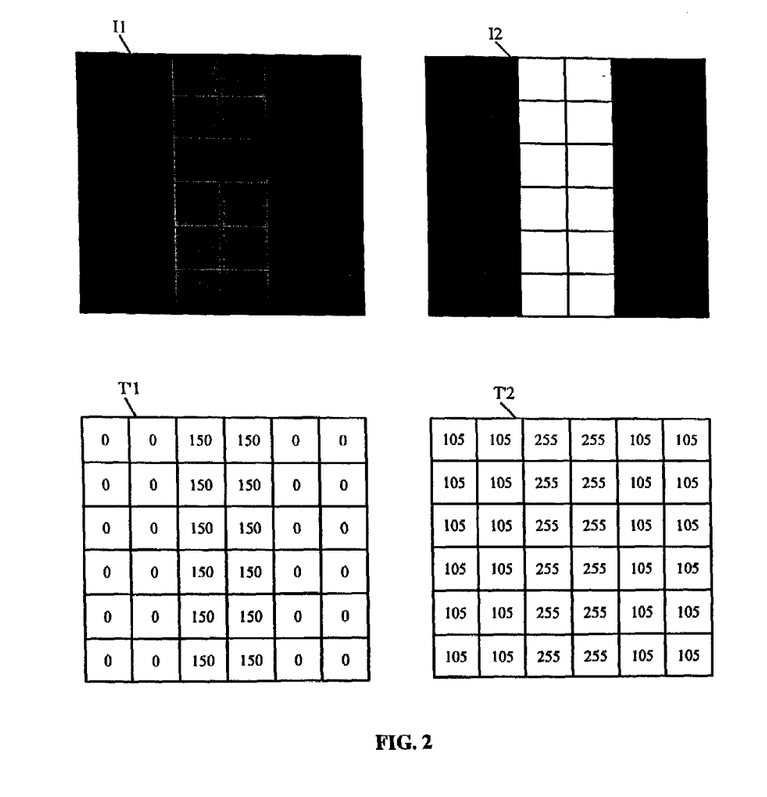
FIG. 2 shows two sub-images I1 and I2 having the same brightness variations as illustrated by the corresponding values depicted in tables T'1 and T'2.

Now, let us consider the case where the input patterns are two sub-images I1 and I2 globally having a similar aspect as shown in FIG. 2. Images I1 and I2, that are comprised of three stripes of twelve pixels (for a total of 36 pixels), slightly distinguishes one from another, in fact, they only differ in terms of global brightness. In the instant case, the brightness of each pixel of sub-images I1 and I2 is coded on 8 bits to have a coding values ranging from 0 (black) to 255 (white) with all the permitted gray levels therebetween. The result of this coding is illustrated by tables T'1 and T'2. As apparent in tables T'1 and T'2, sub-images I1 and I2 have the same brightness gradient, giving them said similar aspect mentioned above and this common characteristic will still be referred to hereinbelow as a "shape". As described above, because the brightness values of the pixels of sub-images I1 and I2 are different, two neurons having the capability to memorize 36 components (corresponding to the 36 coding values of either table which characterize the brightness of a sub-image) are required to store these two sub-images as prototypes during the learning phase even if they have the same shape.

In conclusion, it is thus often necessary to use as many neurons as there are possible variations of a same shape. These variations being defined by at least one parameter (in the two above described examples in terms of mean value or of brightness respectively) of a same shape.

Of course, the problem described above by reference to FIGS. 1 and 2 can be generalized to input patterns having dimensions greater than one (see FIG. 1) or two (see FIG. 2).

The number of neurons is not unlimited in conventional ANNs, so that, when several neurons are required to memorize a same shape, it results a significant waste of the capacity of the ANN to store prototypes and finally, less different shapes can be stored therein. Finally, using several neurons to memorize a same shape decreases the ANN response quality.

Therefore, requiring as many stored prototypes, i.e. neurons, as there are possible variations of a same shape is thus a major inconvenience in conventional ANNs.

SUMMARY OF THE INVENTION

It is therefore a primary object of the present invention to provide a method and circuits for encoding an input pattern using a normalizer and a classifier, such as an input space mapping algorithm based artificial neural network (ANN), in the learning phase and the classification phase.

It is another object of the present invention to provide a method for encoding an input pattern in the learning phase using a normalizer and a classifier that requires only one neuron to store a normalized pattern that represents a plurality of input patterns having an essential characteristic in common but which only differ on at least one parameter related thereto.

It is another object of the present invention to provide a method and circuits for encoding an input pattern in the learning phase using a normalizer and a classifier wherein each input pattern of said plurality is identified by a couple of values.

It is another object of the present invention to provide a method and circuits for encoding an input pattern in the learning phase using a normalizer and a classifier wherein said normalized input pattern and couple of values represent the encoded pattern.

It is still another object of the present invention to provide a method and circuits for encoding an input pattern in the learning phase using a normalizer and a classifier that significantly reduce the number of required prototypes, improving thereby the classifier response quality.

It is still another further object of the present invention to provide a method and circuits for recognizing an (unknown) input pattern that has been previously learned as a prototype in the codebook memory of a classifier by using a normalizer and this codebook memory.

It is still another further object of the present invention to provide a method and circuits for decoding an encoded pattern that has been previously learned in a classifier during the classification phase using a denormalizer and the codebook memory thereof.

Let us consider a plurality of input patterns that have an essential characteristic in common but differing on at least one parameter related thereto (which thus varies from one input pattern to another). According to the method and circuits for encoding an input pattern of the present invention, during the learning phase, each input pattern is first normalized in a normalizer, before it is presented to a classifier, typically an ANN. If not recognized, it is learned, i.e. the normalized pattern is stored in a neuron of the ANN as a prototype with its category assigned to it by the user. As a result, all the input patterns that have an essential characteristic left invariant by the normalizer (shape) but differing on the value of said at least one parameter (main parameter), are thus represented by the same normalized pattern. To that end, the normalizer computes an element, referred to as the main factor, which allows to extract the normalized pattern from the input pattern. Vice versa, a denormalizer is used to retrieve the input pattern from the normalized pattern. As a consequence, any input pattern is simply and fully identified by a couple of values: the category (assigned to the input pattern by the user) and the main factor. This couple of values (identification data) and the normalized pattern represent the encoded pattern according to the present invention.

The normalization step is performed according to a specific mathematical transformation (e.g. a shift, a rotation, . . . ) which depends upon the application in consideration. For instance, let us assume that said input patterns are identical sinewave signals (in amplitude and frequency) having different mean values and that the main parameter is the mean value thereof. The normalized signal is either input signal shifted at the center value (selected as the reference for that parameter) of the range coding the mean values of all these sinewave signals. Any input signal is then represented by the normalized signal and it is only identified by its category and its main factor, i.e. the offset between its mean value and said reference value.

During the classification phase, when a new (unknown) input pattern is to be recognized, it is first normalized in a normalizer by computing the main factor the same way as described above. Then, the normalized pattern is presented to the ANN. If it has been previously learned, the ANN supplies its category. This category and the main factor are identification data that identify said new input pattern and which can be subsequently combined with the normalized pattern to retrieve the original pattern that was previously learned close to the new input pattern.

The method allows a significant reduction of the number of required prototypes, and thus of neurons, improving thereby the ANN response quality.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DESCRIPTION OF A PREFERRED EMBODIMENT

Using the above notations, an essential characteristic that is common to a plurality of input patterns for a particular application is referred to as a "shape". The differences between the input patterns are measured through different values of at least one parameter referred to as the "main parameter". In that meaning, a main parameter thus modifies the input pattern in some extent but not this essential characteristic for the application in consideration.

For the sake of illustration, the encoding method of the present invention will be described by reference to the processing of signals S1, S2 and sub-images I1, I2 shown in FIGS. 1 and 2 respectively.

Figure 1:
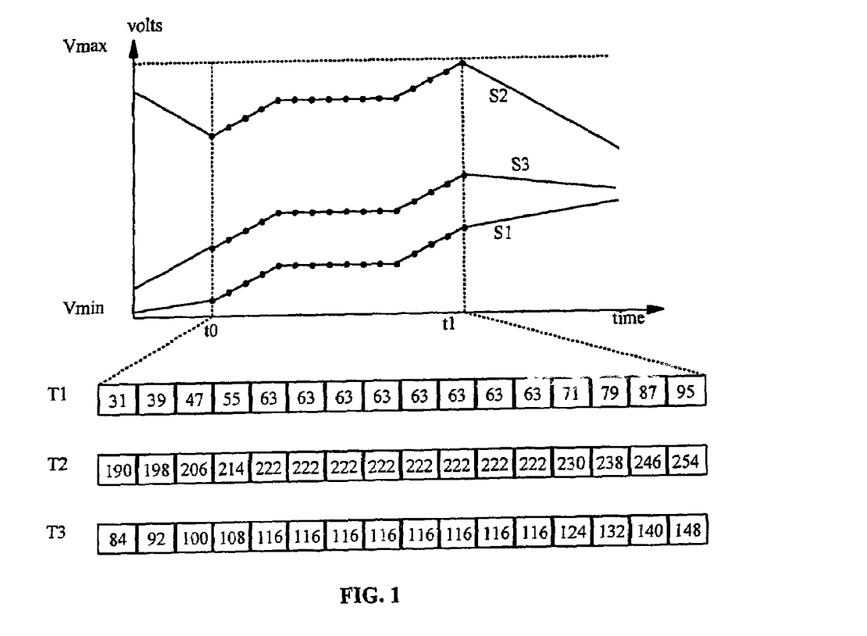
FIG. 1 shows three curves representing electrical signals S1, S2 and S3 having the same voltage amplitude variation in a determined time interval $[t_0, t_1]$ as illustrated by the corresponding values depicted in tables T1, T2 and T3.

As it can be seen in FIG. 1, input signals S1 and S2 have the same voltage amplitude variation in the time interval $[t_0, t_1]$, so that only one signal S could represent this common characteristic as a shape. In order to optimize the coding dynamic, preferably, signal S should be centered as close as possible of the coding range center value, i.e. $(V_{max}-V_{min})/2$. Still assuming that $V_{min}=0$ and $V_{max}=255$ for the sake of simplicity, signal S should be centered at $\overline{V}=127$. The voltage mean values of S1 and S2 signals (given by the sum of all the coding values divided by the total number of sampling points would be $\overline{V_1}=63$ and $\overline{V_2}=222$ respectively. Thus, with respect to signal S, signal S1 must be shifted by an offset value equal to $Offset_1=\overline{V}-\overline{V_1}=127-63=64$ and signal S2 must be shifted by an offset value equal to $Offset_2=\overline{V}-\overline{V_2}=127-222=-95$.

Figure 3:
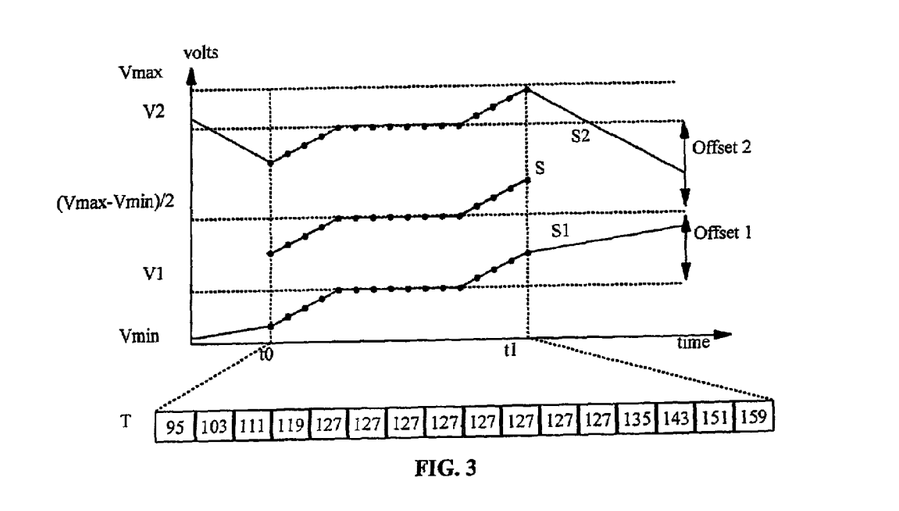
FIG. 3 shows curves representing signals S1 and S2 of FIG. 1 and signal S which is obtained after normalization of either signal S1 or S2 and the corresponding values depicted in table T according to the present invention.

FIG. 3 shows the signal S that is obtained as a result of either shift and the corresponding voltage amplitude values (centered around $\overline{V}=(V_{max}-V_{min})/2=127$ with the above assumptions) are depicted in table T. Signal S is said "normalized" and aims to represent all signals having the same voltage amplitude variation in the said time interval $[t_0, t_1]$. In the instant case, the normalization, performed in a normalizer, thus consists to compute the respective offset for each signal S1 and S2 and then to set the normalized signal S, which is thus either signal S1 or S2 shifted to a mean value set as close as possible of the center (selected here as the reference value for the normalizer) of the mean range coding values. As apparent in FIG. 3, normalized signal S which is centered around the $(V_{max}-V_{min})/2$ value, represents either signal S1 or S2 with an offset between their respective mean values equal to $Offset_1$ or $Offset_2$. These offset values that are computed in the normalizer, are referred to hereinbelow as the "main factors" of signals S1 and S2.

Let us now consider input signals S1, S2, . . . that are sequentially applied for the first time to an unit comprised of a normalizer and an ANN that are serially connected. Signal S1 is normalized and appears as normalized signal S with a main factor equal to $Offset_1$. Now, normalized signal S is presented to the ANN, and if not recognized by the ANN, it is learned and stored in a neuron as a new prototype. Then, when signal S2 is presented, the normalizer performs the same operation, but in this case, the normalized signal S that is produced, is recognized by the ANN and therefore is not stored therein as a different prototype. It just remains its main factor $Offset_2$ that is computed by the normalizer. More generally, if we consider different types of signals (e.g. sinewave, pulse, sawtooth and the like) which belong to different categories according to values assigned by the user (in the usual meaning used in the conventional ANN field), any input signal processed as described above, that has been learned, will be represented by a normalized signal, with its main factor and category values associated thereto. The main factor and the category are the identification data mentioned above, in other words, its signature. Therefore, during the learning phase, instead of storing signals S1 and S2 in two different neurons of the ANN as standard, only one neuron is used to store normalized signal S as a prototype. Either input signal S1 or S2 is represented by said normalized signal S (stored in a neuron), its category and its main factor (offset). This combination will be referred to hereinbelow as the encoded input signal.

During the classification phase, the same normalization is performed on the new (unknown) input signal before it is compared with all the prototypes stored in the ANN for distance evaluation. If recognized by a neuron, e.g. the neuron storing normalized signal S, the ANN will output its category. This category and the main factor (provided by the normalizer) represent said identification data that are sufficient to identify the new input signal in consideration. However, it is possible to go further and retrieve an input signal that is close to the original input signal (S1, S2, . . . ). To that end, the category is applied to the ANN storing the normalized signals, so that, if it is recognized, the corresponding normalized signal, e.g. normalized signal S is output from the ANN. It is to be noted that only the storage part of the ANN (referred to as the codebook memory) is used in this case, but not the calculation part thereof. The normalized signal S is then applied to a denormalizer which receives the main factor as an input data and performs the reverse operation to retrieve an input signal that is close to the original input signal.

Figure 4:
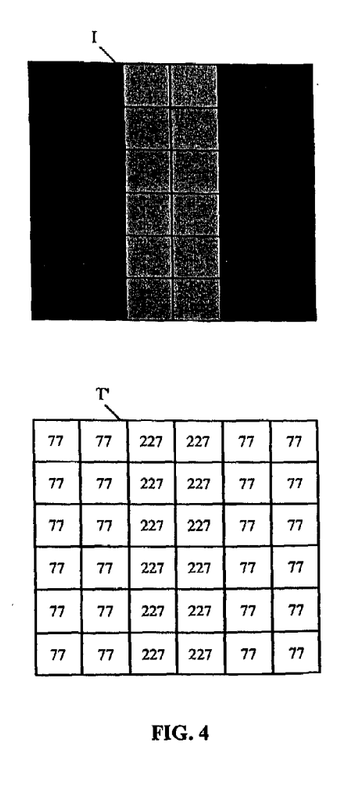
FIG. 4 shows the sub-image I which is obtained after normalization of either sub-image I1 or I2 of FIG. 2 and the corresponding values depicted in table T' still according to the present invention.

Tables T'1 and T'2 depicted in FIG. 2 shows the brightness values of the pixels forming sub-images I1 and T2, which in turn allow to determine the brightness mean value and then to compute the required offsets that are necessary for their normalization. Once, the brightness values of sub-images I1 and I2 have been shifted by these offsets, the shape is then represented by normalized sub-image I and its corresponding table labeled T' in FIG. 4. During the learning phase, the normalized sub-image I is stored in one neuron of the ANN as a prototype. The computed offsets are the main factors which in combination with their associated category (given by the user) still form the said identification data mentioned above for either sub-image I1 or I2. During the classification phase, the same normalization is performed on the new (unknown) sub-image before the normalized sub-image is compared with the prototypes stored in the ANN to determine its category if recognized (i.e. if it has been previously learned). This category and the main factor (computed by the normalizer) represent the identification data that are sufficient to identify the new input sub-image in consideration. The next steps of retrieving an sub-image as close as possible of the original input sub-image that has been learned are the same as described above by reference to normalized signal S.

Therefore, according to the method of the present invention, each input pattern is presented to an encoding unit comprised of a normalizer and an ANN that are serially connected. The main factor is computed and the input pattern is normalized before it is presented to the ANN. As a result, only normalized patterns are stored as prototypes in the neurons of the ANN during the learning phase (if they need to be learned). The normalization thus consists to compute the main factor and then to set the normalized pattern. In the two above described examples, the main parameter is a voltage and a brightness respectively, and in this case, the normalization consists to compute the respective offsets with the center value of the mean value coding range and then to perform a shift. More generally, one could envision that each input pattern is normalized using a specific mathematical transformation different from a shift, for instance a rotation. After encoding, each input pattern is thus finally characterized by its normalized pattern and identification data attached thereto: its category and its main factor (an offset value in both cases). During the classification phase, the same normalization process is performed on the new (unknown) input pattern before it is compared with the prototypes stored in the ANN for distance evaluation. To that end, the same encoding unit is used. if the normalized pattern is recognized, the ANN supplies its category. The category and the main factor computed by the normalizer are identification data that are sufficient to subsequently retrieve an input pattern close to the original input pattern that has been learned.

Figure 5:
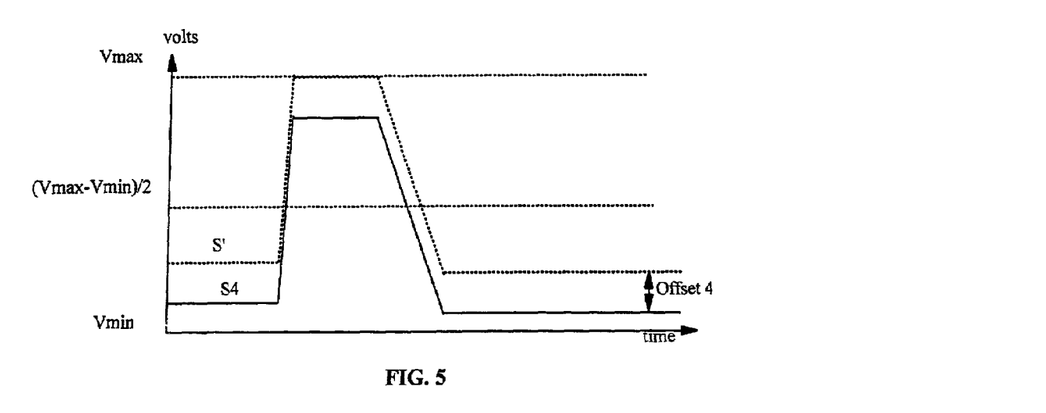
FIG. 5 shows curves representing electrical signals S4 and S' wherein the mean value of signal S' obtained after normalization of signal S4 cannot be set at the center of the voltage range for overflow reasons.

In the example illustrated by reference to FIG. 3, the normalization consists in shifting the input signals S1 and S2 (taking the mean value coding range center as the reference) without taking into account a possible overflow. However, in some cases it may happen that some values of the normalized signal may be out of the coding range, i.e. lower than the minimum or greater than maximum value of the components. A ZISC ANN is comprised of a plurality of neurons, each neuron has a limited number of components, each component being coded between determined minimum and maximum values. Typically, each ZISC neuron has 64 components, each being coded on 8 bits (i.e. 256 values between 0 and 255). Any overflow would obviously contribute to decrease the ANN response quality. FIG. 5 illustrates a pulse signal S4 which cannot be set at the center (half value) of the mean value coding range, i.e. $(V_{max}-V_{min})/2$, as described above for normalization. As apparent in FIG. 5, if signal S4 mean value is set to half of the coding range, the top part of the signal will be clamped which is not acceptable. In this case, the normalized signal represented by S' is obtained by shifting signal S4 with an offset equal to Offset4 so that its mean value is not equal to the half value of the coding range. More generally, it must be checked that the normalized signal is within the $(V_{max}, V_{min})$ range. To overcome this drawback, the minimum and maximum values of an input pattern are used during the offset computation. As a result, the normalization now thus consists in shifting an input pattern as close as possible to the center of the mean value coding range but in such a way that the minimum and maximum component values are not out of the minimum and maximum component coding range values. The component values of the normalized pattern to be learned (or classified) are evaluated using the following equations wherein:

$A_{ij}$ is the value of the component i of the input pattern j;
$A'_{ij}$ is the value of the component i of the normalized pattern j;
$Mean_j$ is the mean value of the pattern j;
$Min_j$ is the minimum value among all the components of the input pattern j;
$Max_j$ is the maximum value among all the components of the pattern j;
$Offset_j$ is the value used to shift the pattern j in order to set its mean value as close as possible to the mean value coding range; and,
Max is the maximum value that can be reached by a component (for the sake of simplicity, we assume that the minimum value that can be reached by a component is zero. The equations are:

$$Mean_j = \frac{1}{n}\sum_{i=1}^{n} A_{ij} \qquad (1)$$

$$Min_j = \min_{i=1...n}(A_{ij}) \qquad (2)$$

$$Max_j = \max_{i=1...n}(A_{ij}) \qquad (3)$$

$$Offset_j = \frac{1}{2}Max - Mean_j \qquad (4)$$

If $Offset_j \geq 0$, then $Offset_j = min(Offset_j, Max - Max_j)$
If $Offset_j < 0$, then $Offset_j = max(Offset_j, -Min_j)$ and finally, the component values of the normalized pattern are such as:

$A'_{ij} = A_{ij} + Offset_j$

A normalizer adequate to perform this transformation based on equations (1) to (4) to compute the main factor ($Offset_j$) that is necessary to set the normalized pattern, e.g. by shifting the input pattern of that value, can be designed or integrated in a programmable logic device (PLA) without any difficulty for the skilled professional.

For sake of clarity, the above described normalization process is only based on a shifting operation. However, it will be obvious that other mathematical transformations may be used as well.

Figure 6:
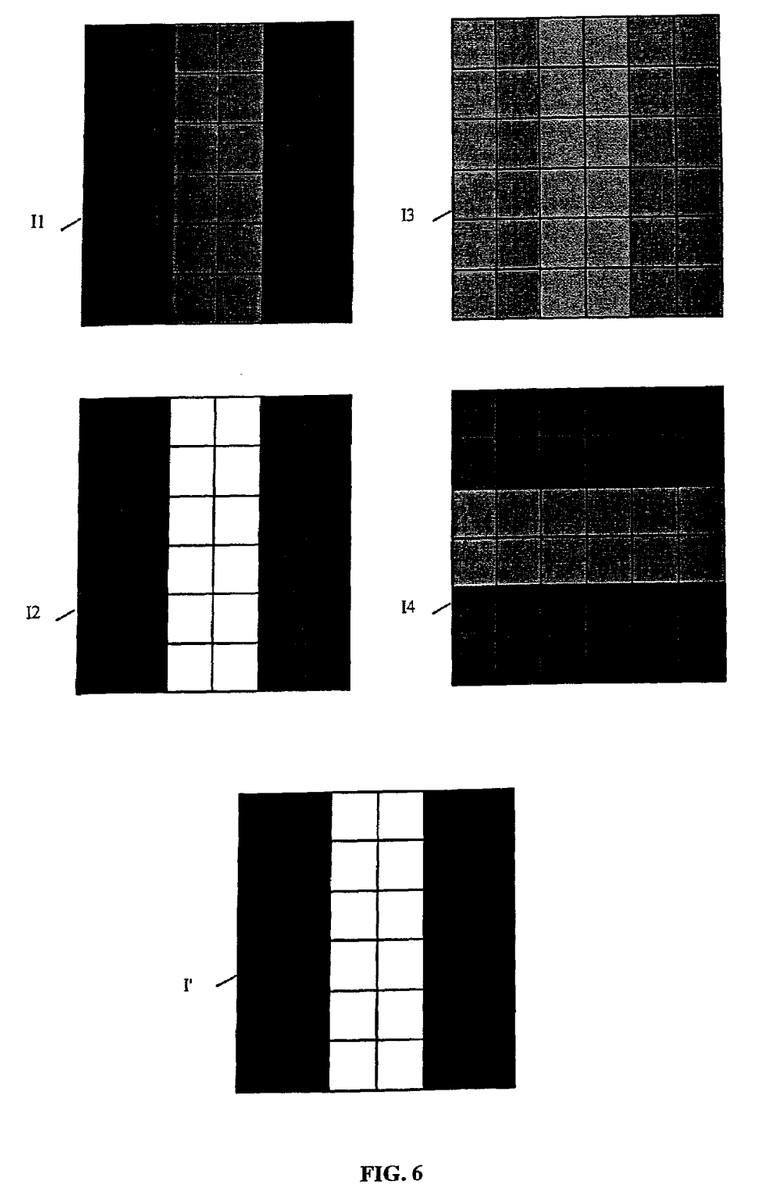
FIG. 6 shows a more general case wherein four sub-images I1 to I4 can be represented by only one normalized sub-image I' irrespective of variations in brightness, contrast and orientation still according to the present invention.

In that respect, FIG. 6 shows four different sub-images I1 to I4 having a similar aspect but which differ on three main parameters : brightness, contrast and orientation. An offset used to shift the sub-image for the brightness, an adapted gain for the contrast and a rotation angle to adjust the orientation, represent the three main factors for this normalization step. Finally, these four sub-images are represented by normalized sub-image I' stored in the ANN as a single prototype. The normalized sub-image I' is thus the invariant part of sub-images I1 to I4 with regards to these three main parameters. During the classification phase, each of the four sub-image I1 to I4 will be recognized as described by normalized sub-image I'.

Figure 7:
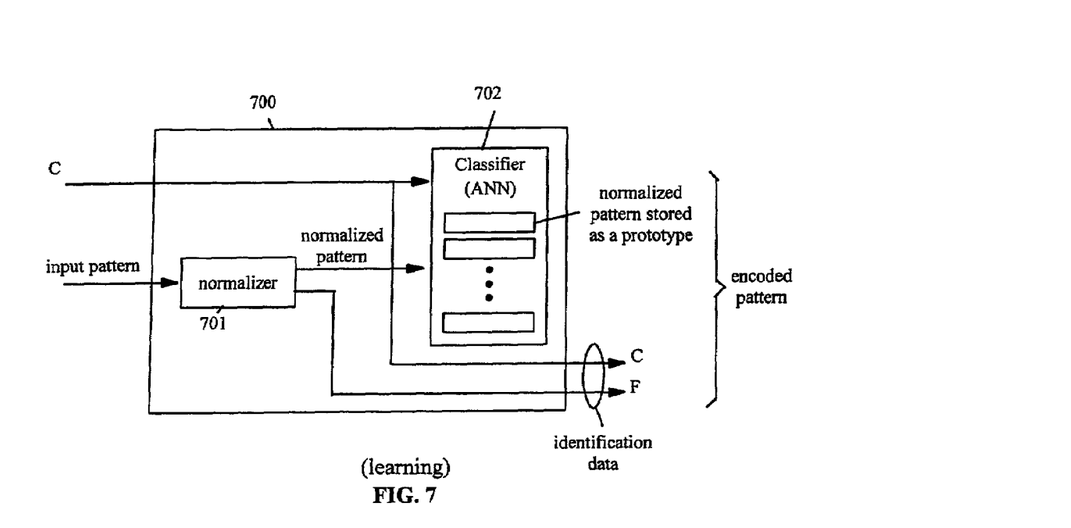
FIG. 7 represents the encoding unit adapted to encode the input patterns according to the method of the present invention.

FIG. 7 shows the encoder unit to illustrate the method of encoding the input patterns during the learning phase according to the present invention. Now turning to FIG. 7, the encoding unit 700 is comprised of a normalizer 701 and a classifier 702 such as the ZISC ANN mentioned above that are connected in series. An input pattern is applied to the normalizer 701 which computes the main factor F for the main parameter in consideration (for instance an offset with a reference value thereof) and extracts the normalized pattern (i.e. the shape). The normalized pattern is presented to the classifier 702 with its category C assigned by the user as standard. If not recognized, the normalized pattern is learned, i.e. it is stored in a neuron of the classifier 702 as a prototype with its category C associated thereto. The category C and the main factor F are the identification data mentioned above, which, in combination with the normalized pattern represent the encoded pattern according to the present invention.

During the classification phase, the normalized patterns stored in the codebook of the classifier are used to find the closest prototype(s) matching with the new (unknown) input pattern and then, if so required, an additional step is performed to retrieve a pattern close to said new input pattern as it will be now described by reference to FIGS. 8a and 8b.

Figure 8:
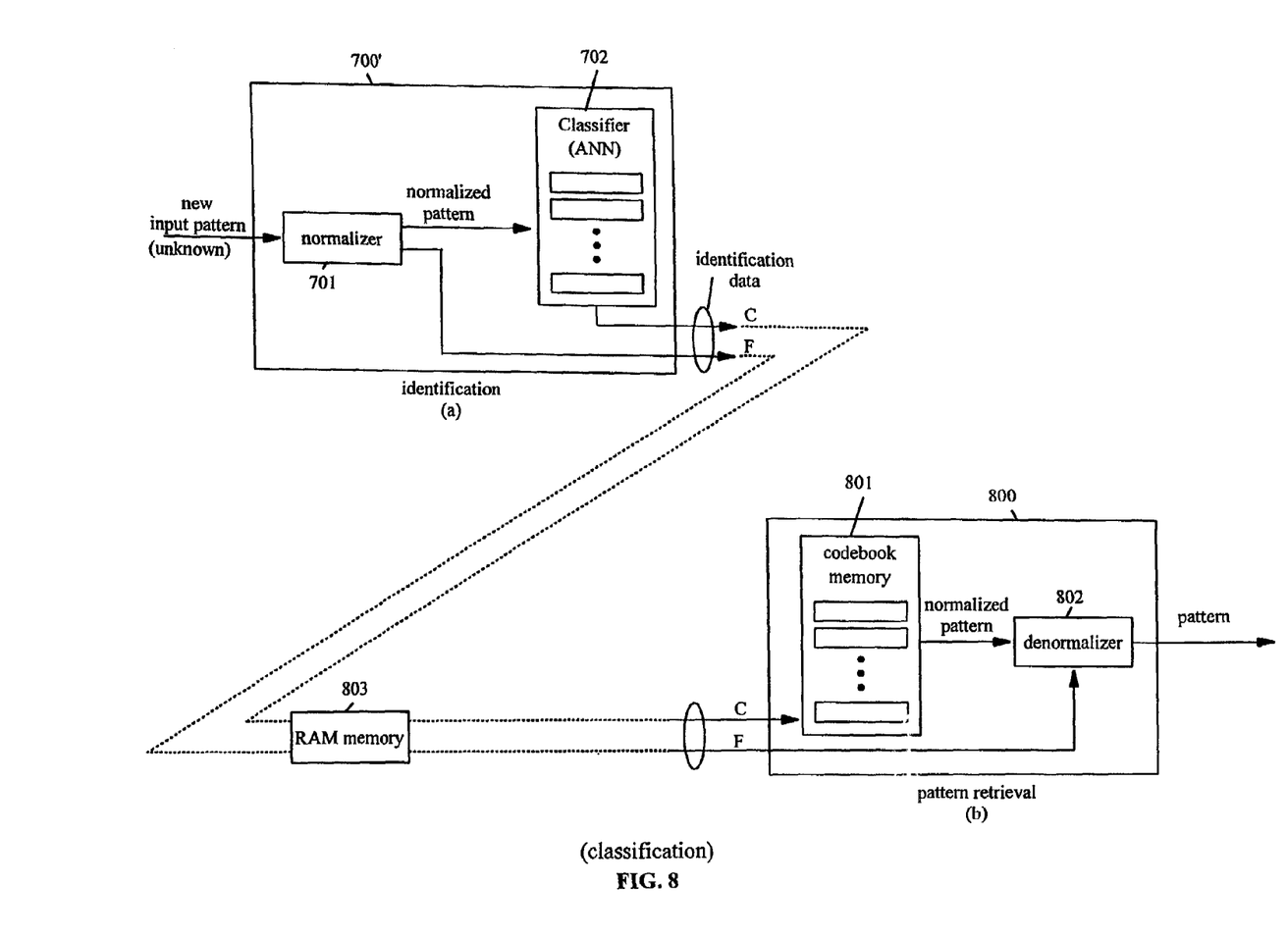
FIGS. 8*a* and 8*b* respectively represent the encoding unit to recognize a new (unknown) input pattern for its identification and the decoding unit that is further required if the original input pattern that has been previously learned needs to be retrieved still according to the method of the present invention.

Turning to FIG. 8a, the new (unknown) input pattern is applied to an encoding unit 700' comprised of a normalizer 701' and a classifier 702' that are serially connected (units 700' and 700' are quite identical from an hardware point of view except in that unit 700' does not need to receive the category signal C. Normalizer 701 computes the main factor F and extracts the normalized pattern as described above by reference to FIG. 7. The normalized pattern is then presented to the classifier 702. If the normalized pattern is recognized, the latter outputs its category C. The combination of the category C and the main factor F are the identification data mentioned above that suffice to identify the new input pattern. If it is required to retrieve the input pattern corresponding to these identification data, a decoding unit 800, comprised of the codebook memory 801 of classifier 702 and a denormalizer 802 that are connected in series as apparent in FIG. 8b, has to be used.

Now turning to FIG. 8b, the category C is applied to the codebook memory 801 as an address, normalized pattern corresponding to that category is output and applied to the denormalizer 802 which also receives the main factor F. A pattern that has been learned, i.e. close to the input pattern applied to unit 700', is then reconstructed in the denormalizer 802 by the reverse mathematical transformation and is output therefrom. The identification data (a couple of values C and F) for each new input pattern can be stored in a RAM memory 803 for convenience. In the RAM memory 803, said identification data form a table with two entries that allows an easy and immediate identification of any input pattern that has been learned.

The method of the present invention may be efficiently used in conjunction with the Vector Quantization (VQ), a technique widely used for image/video compression. The advantage of VQ compression is that it needs only standard hardware for compression (for example an ANN constructed with ZISC neurons) and real-time software for decompression (e.g. based on the principle described below). In particular, this technique is well adapted for image/video compression on Internet where it could be possible to use servers based on ANNs for compression and user's personal computer for decompression.

The standard VQ compression algorithm is based on sub-images analysis. A codebook is made up (statically or dynamically) to associate an index to each sub-image of an image. For the sake of simplicity, it is assumed in the following description that gray level images are used. Each sub-image of an image to be compressed may be referenced by the index of the closest sub-image stored in the codebook memory. Thus, to transmit an image, a set of indexes is transmitted instead of all the pixels of the image. For example, considering a 1024×768 pixel image (XGA) and 8×8 pixel sub-images, it is necessary to transmit $$\frac{1024 \times 768}{8 \times 8} = 12,288$$

indexes instead of 1024×768=786,432 pixels. Now, considering that each pixel is coded with a byte and each index is coded with 14 bits, the compression ratio is $$\frac{786,432}{12,288} \times \frac{8}{14} = 36.57.$$

However, although there is a good compression ratio, the main problem lies in the number of sub-images that is required to totally fill the codebook, i.e. $2^{14}$. This number must be large enough to obtain a good quality response. A blocking effect due to an insufficient number of sub-images stored in the codebook often appears when using this compression technique.

Using the method of the present invention, the quality of the decompressed image can be increased while decreasing the number of sub-images stored in the codebook memory of the classifier. When making up the codebook, the input patterns are normalized before they are stored as prototypes in the classifier (e.g. a ZISC ANN).

Figure 9:
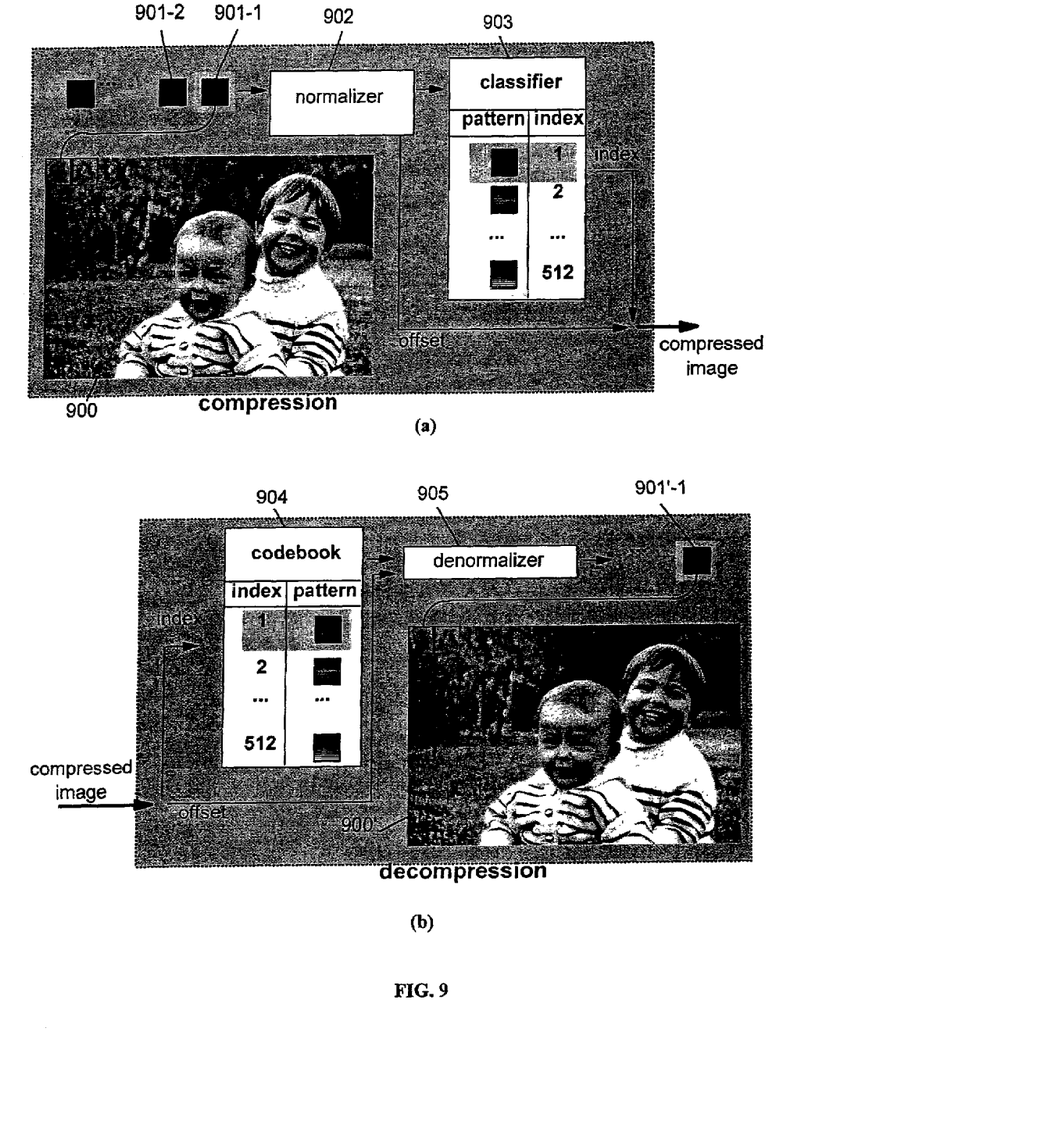
FIG. 9 illustrates an example of the present invention when it is used for image compression/decompression based on Vector Quantization (VQ) to reduce the number of required prototypes stored in an ANN and thus to improve its response quality.

FIGS. 9a and 9b illustrate the compression and decompression techniques based on the methods of encoding and decoding described above by reference to FIGS. 8a and 8b respectively. During the compression process, the offset (or bias) of each sub-image 901-1, 901-2, . . . extracted from the image 900 to be compressed is normalized in block 902. Then, using the classifier 903 of FIG. 9a, the closest sub-image of the codebook, memorized as a prototype, is found. Thus, each normalized sub-image of image 900 is characterized by the index of the closest sub-image stored in the codebook. After having processed all the sub-images, the encoded image, i.e. the compressed image, consists in a set of characterizing indexes and offsets.

Now, turning to the decompression process, the characterizing indexes are used to extract the closest normalized sub-image stored in the codebook memory 904 of classifier 903 and this sub-image is denormalized using its offset in denormalizer 905 to produce a decompressed sub-image 901'-1, 901'-2, . . . . The encoded image is thus decompressed by processing the set of characterizing indexes/offsets to produce the decompressed image 900'.

Using the above example, still considering a 1024×768 pixel image and 8×8 pixel sub-images, it is necessary to transmit 12,288 indexes and 12,288 offsets instead of 786,432 pixels. Now, considering that each pixel is coded with a byte, that each index is coded with 9 bits and each offset is coded with 5 bits (still for a total of 14 bits), the compression ratio remains equal to $$36.57 = \frac{786,432}{12,288} \times \frac{8}{9+5},$$

but the number of sub-images that is now required in the codebook memory is reduced to $2^9$ instead of $2^{14}$ with the standard VQ technique.

Dealing with color images in which each pixel is represented with three values (generally RGB or YUV) does not really affect this method. A first approach consists in using sub-images having a third dimension to code the color component, e.g. red, green and blue (R, G and B). For example, instead of using 64 component sub-images (8×8 pixels), 192 components are used (8×8×3). However, due to the larger component number, more prototypes are required to be mapped with the same precision, so that the image compression quality may be disappointing. A second solution consists in considering a color image as three independent images, each representing a color component, e.g. red, green and blue (R, G and B), and then processing independently these three images during compression and decompression phases. The codebooks used for each type of image, e.g. R, G and B, may or not be the same.

Figure 10:
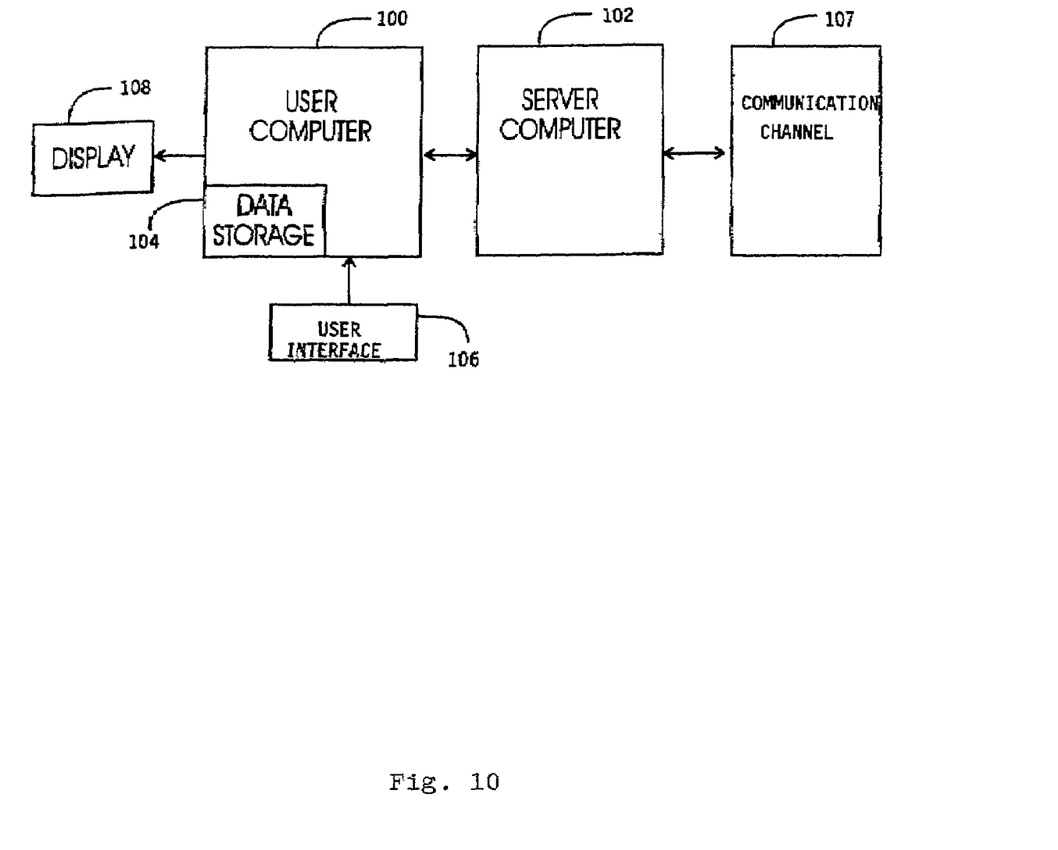
FIG. 10 is a block diagram of one embodiment of a typical apparatus incorporating features of the present invention that may be used to practice the present invention.

The present invention may also include software and computer programs incorporating the process steps and instructions described above that are executed in different computers. FIG. 10 is a block diagram of one embodiment of a typical apparatus incorporating features of the present invention that may be used to practice the present invention. As shown, a computer system 100 may be linked to another computer system 102, such that the computers 100 and 102 are capable of sending information to each other and receiving information from each other. In one embodiment, computer system 102 could include a server computer adapted to communicate with a network, such as for example, the Internet. Computer systems 100 and 102 can be linked together in any conventional manner including a modem, hard wire connection, or fiber optic link. Generally, information can be made available to both computer systems 100 and 102 using a communication protocol typically sent over a communication channel 108, or through a dial-up connection on ISDN line. Computers 100 and 102 are generally adapted to utilize program storage devices embodying machine readable program source code which is adapted to cause the computers 100 and 102 to perform the method steps of the present invention. The program storage devices incorporating features of the present invention may be devised, made and used as a component of a machine utilizing optics, magnetic properties and/or electronics to perform the procedures and methods of the present invention. In alternate embodiments, the program storage devices may include magnetic media such as a diskette or computer hard drive, which is readable and executable by a computer. In other alternate embodiments, the program storage devices could include optical disks, read-only-memory ("RON") floppy disks and semiconductor materials and chips.

Computer systems 100 and 102 may also include a microprocessor for executing stored programs. Computer 102 may include a data storage device 104 on its program storage device for the storage of information and data. The computer program or software incorporating the processes and method steps incorporating features of the present invention may be stored in one or more computers 100 and 102 on an otherwise conventional program storage device. In one embodiment, computers 100 and 102 may include a user interface 106, and a display interface 108 from which features of the present invention can be accessed. The user interface 106 and the display interface 108 can be adapted to allow the input of queries and commands to the system, as well as present the results of the commands and queries.

While the invention has been particularly described with respect to a preferred embodiment thereof it should be understood by one skilled in the art that the foregoing and other changes in form and details may be made therein without departing from the spirit and scope of the invention.

What is claimed is:

1. Method for encoding an input pattern of each of a succession of input signals using a normalizer and a classifier during a learning phase, said input pattern being characterized by an essential feature or shape and at least one main parameter, wherein said main parameter is an element susceptible of modifying the input pattern but not the shape, comprising the steps of:

establishing a reference value for the main parameter;

applying said input pattern for each of said succession of input signals to a normalizer that computes a main factor which measures an offset difference between the main parameter value of said input pattern and said reference value, and that sets the input pattern at said reference value as a normalized pattern using said main factor;

applying said normalized pattern for each of said succession of input signals and the category associated thereto by the user to a classifier; and, storing the normalized pattern of a first input signal of said succession of input signals in the classifier as a prototype;

wherein said normalized pattern, said category and said main factor represent the encoded pattern; and classifying individual ones of said input signals following said first input signal by use of the stored prototype of said first input signal, wherein, in said classifying, an input signal pattern is compared with the stored prototype.

2. The method of claim 1 wherein said at least one main parameter is a mean value, and said main factor consists of an offset used to shift the input pattern to said reference value.

3. The method of claim 1 wherein said at least one main parameter is the orientation of the input pattern, and said main factor consists of an angle value used to rotate the input pattern to said reference value.

4. The method of claim 1 wherein said at least one main parameter is the amplitude of the input pattern, and said main factor consists of a gain used to modify the input pattern to said reference value.

5. The method of claim 1 wherein said classifier is an input space mapping algorithm based artificial neural network (ANN).

6. The method of claim 5 wherein said ANN comprises at least one ZISC neuron.

7. Method for encoding a new unknown input pattern of each of a succession of input signals using a normalizer and a classifier during a classification phase, said new input pattern being characterized by an essential feature or shape and at least one main parameter, wherein said main parameter is an element susceptible of modifying the new input pattern but not the shape, comprising the steps of:

establishing a reference value for the main parameter;

applying said new input pattern for each of said succession of input signals to a normalizer that computes a main factor which measures an offset difference between the main parameter value of said new input pattern and said reference value, and that sets the input pattern at said reference value as a normalized pattern using said main factor; and, applying said normalized pattern for each of said succession of input signals to a classifier having normalized patterns stored therein as prototypes to generate the category by comparing an input signal pattern with a stored prototype, wherein the normalized patterns stored in the classifier are obtained from normalized patterns of previous input signals in said succession of input signals.

8. The method of claim 7 wherein said at least one main parameter is of a mean value and said main factor consists of an offset used to shift the input pattern, to said reference value.

9. The method of claim 7 wherein said at least one main parameter is the orientation of the input pattern and said main factor consists of an angle value used to rotate the input pattern to said reference value.

10. The method of claim 7 wherein said at least one main parameter is the amplitude of the input pattern, and said main factor consists of a gain used to modify the input pattern to said reference value.

11. The method of claim 7 wherein said classifier is an input space mapping algorithm based artificial neural network (ANN).

12. The method of claim 11 wherein said ANN comprises at least one ZISC neuron.

13. A method for decoding a new unknown input pattern of each of a succession of input signals during a classification phase, said new input pattern being characterized by an essential feature or shape and at least one main parameter, wherein said main parameter is an element susceptible of modifying the new input pattern but not the shape, comprising the steps of:

establishing a reference value for the main parameter;

applying said new input pattern to a normalizer that computes a main factor which measures an offset difference between the main parameter value of said new input pattern and said reference value, and that sets the input pattern at said reference value as a normalized pattern using said main factor;

applying said normalized pattern to a classifier having normalized patterns stored therein as prototypes to generate the category by comparing an input signal pattern with a stored prototype, wherein the normalized patterns stored in the classifier are obtained from normalized patterns of previous input signals in said succession of input signals, wherein said prototypes represent the codebook memory of the classifier, and wherein said category and said main factor are the identification data of said new input pattern;

applying said category to said codebook memory to extract the normalized pattern corresponding thereto; and, applying said normalized pattern and the main factor to a denormalizer to retrieve a pattern close to said new input pattern.

14. The method of claim 13 wherein said at least one main parameter is of a mean value, and said main factor consists of an offset used to shift the input pattern to said reference value.

15. The method of claim 13 wherein said at least one main parameter is the orientation of the input pattern, and said main factor consists of an angle value used to rotate the input pattern to said reference value.

16. The method of claim 13 wherein said at least one main parameter is the amplitude of the input pattern and said main factor consists of a gain used to modify the input pattern to said reference value.

17. The method of claim 13 wherein said classifier is an input space mapping algorithm based artificial neural network (ANN).

18. The method of claim 17 wherein said ANN comprises at least one ZISC neuron.

19. A system for encoding an input pattern of each of a succession of input signals, said input pattern being characterized by an essential feature or shape and at least one main parameter, wherein said main parameter is an element susceptible of modifying the input pattern but not the shape, comprising:

means for applying the input pattern to a normalizer;

means for applying a category to an ANN;

the normalizer having a reference value for that parameter stored therein that computes a main factor which measures an offset difference between the main parameter value of said input pattern and a reference value thereof and that sets the input pattern at said reference value as a normalized pattern using said main factor; and, an ANN adapted to receive said normalized pattern and to store the normalized pattern in a neuron of the ANN as a prototype for analysis of subsequent input signals of said succession of input signals with the category associated thereto, wherein, in said analysis, an input signal pattern is compared with the stored prototype;

wherein said normalized pattern, said category and, said main factor represent the encoded pattern.

20. An identification system for encoding a new unknown input pattern of each of a succession of input signals, said input pattern being characterized by an essential feature or shape and at least one main parameter, wherein said main parameter is an element susceptible of modifying the input pattern but not the shape, comprising:

means for applying the new input pattern to a normalizer;

the normalizer having a reference value for the parameter stored therein and computing a main factor which measures an offset difference between the main parameter value of said new input pattern and a reference value thereof, and setting the new input pattern at said reference value as a normalized pattern using said main factor; and, a classifier storing the normalized patterns of individual ones of input signals of said succession of input signals that have been previously learned in the codebook thereof as prototypes, the prototypes serving for analysis of subsequent input signals of said succession of input signals with the category associated thereto adapted to receive said normalized pattern from the normalizer to generate the category of the normalized pattern, wherein, in said analysis, an input signal pattern is compared with a stored prototype.

21. A retrieval system adapted to decode a new unknown input vector during a classification phase, the new input vector describing an input pattern of each of a succession of input signals, said input pattern being characterized by an essential feature or shape and at least one main parameter, wherein said main parameter is an element susceptible of modifying the input pattern but not the shape, comprising:

means for applying the new input pattern to a normalizer;

the normalizer having a reference value for the parameter stored therein and computing a main factor which measures an offset difference between the main parameter value of said new input pattern and a reference value thereof, and setting the new input pattern at said reference value as a normalized pattern using said main factor;

a classifier storing the normalized patterns of individual ones of input signals of said succession of input signals that have been previously learned in the codebook thereof as prototypes with the category associated thereto adapted to receive said normalized pattern from the normalizer to generate the category of the normalized pattern, wherein, in said classification phase, an input signal pattern is compared with a stored prototype;

means for applying the category of the normalized pattern to the codebook memory of the classifier;

means for applying the main factor to a denormalizer;

means for extracting the normalized pattern corresponding to that category from the codebook memory; and, a denormalizer adapted to receive said main factor and said normalized pattern to retrieve a pattern close to the original input pattern.

22. A computer program product comprising:

a computer usable medium having computer readable code means embodied therein for causing a computer to encode an input pattern of each of a succession of input signals using a normalizer and a classifier during a learning phase, the input pattern having an essential feature or shape and at least one main parameter that is an element susceptible of modifying the input pattern but not the shape, the computer readable code means in the computer program product comprising:

computer readable program code means for causing a computer to establish a reference value for the main parameter;

computer readable program code means for causing a computer to apply the input pattern for each of said succession of input signals to a normalizer that computes a main factor that measures an offset difference between the main parameter value of the input pattern and the reference value, and that sets the input pattern at the reference value as a normalized pattern using the main factor;

computer readable program code means for causing a computer to apply the normalized pattern and the category associated thereto by the user to a classifier; and computer readable program code means for causing a computer to store the normalized pattern in the classifier as a prototype to be compared with an input signal pattern, wherein the normalized pattern, the category and the main factor represent the encoded pattern.

23. An article of manufacture comprising:

a computer usable medium having computer readable program code means embodied therein for causing a computer to encode a new unknown input pattern of each of a succession of input signals using a normalizer and a classifier during a classification phase, the new input pattern having an essential feature or shape and at least one main parameter, wherein the main parameter is an element susceptible of modifying the new input pattern but not the shape, the computer readable code means in the article of manufacture comprising:

computer readable program code means for causing a computer to establish a reference value for the main parameter;

computer readable program code means for causing a computer to apply the new input pattern to a normalizer that computes a main factor that measures an offset difference between the main parameter value of the new input pattern and the reference value, and that sets the input pattern at the reference value as a normalized pattern using the main factor; and computer readable program code means for causing a computer to apply the normalized pattern to a classifier having normalized patterns stored therein as prototypes to generate the category by comparison of an input signal pattern with a stored prototype, wherein the normalized patterns stored in the classifier are obtained from normalized patterns of previous input signals in said succession of input signals.

* * * * *

UNITED STATES PATENT AND TRADEMARK OFFICE
CERTIFICATE OF CORRECTION

PATENT NO. : 7,133,854 B2
APPLICATION NO. : 10/014166
DATED : November 7, 2006
INVENTOR(S) : Imbert De Tremiolles et al.

It is certified that error appears in the above-identified patent and that said Letters Patent is hereby corrected as shown below:

Col. 13, line 6, Claim 8, after "pattern" delete ",".

Col. 14, line 21, Claim 19, after "and" delete ",".

Col. 15, line 13, Claim 22, delete "usable" and insert -- useable --, therefor.

Col. 16, line 7, Claim 23, delete "usable" and insert -- useable --, therefor.

Signed and Sealed this

Twelfth Day of June, 2007

JON W. DUDAS
*Director of the United States Patent and Trademark Office*